United States Patent [19]

Pratt

[11] Patent Number: 5,066,179

[45] Date of Patent: * Nov. 19, 1991

[54] BLIND FASTENER

[75] Inventor: John D. Pratt, Rancho Cucamonga, Calif.

[73] Assignee: MAG Aerospace Industries, Inc., Los Angeles, Calif.

[*] Notice: The portion of the term of this patent subsequent to Nov. 6, 2007 has been disclaimed.

[21] Appl. No.: 828,781

[22] Filed: Feb. 12, 1986

Related U.S. Application Data

[63] Continuation of Ser. No. 583,029, Feb. 23, 1984, abandoned.

[51] Int. Cl.5 .............................................. F16B 13/06
[52] U.S. Cl. ...................................... 411/34; 411/43; 411/55
[58] Field of Search ....................... 411/34, 35, 36, 37, 411/38, 43, 45, 55, 70; 29/509, 522 R, 523

[56] References Cited

U.S. PATENT DOCUMENTS

| | | |
|---|---|---|
| 1,551,381 | 8/1925 | Foss . |
| 2,099,678 | 11/1937 | Curtis . |
| 2,282,711 | 5/1942 | Eklund ................... 411/43 |
| 2,765,699 | 10/1956 | LaTorre . |
| 2,884,099 | 4/1959 | Nenzell . |
| 2,915,934 | 12/1959 | La Torre . |
| 2,974,553 | 3/1961 | Hodell . |
| 3,129,630 | 4/1964 | Wing et al. . |
| 3,236,143 | 2/1966 | Wing ....................... 411/34 |
| 3,253,495 | 5/1966 | Orloff . |
| 3,276,308 | 10/1966 | Bergere . |
| 3,302,510 | 2/1967 | Gapp ....................... 411/43 |
| 3,357,094 | 12/1967 | Mouck . |
| 3,643,544 | 2/1972 | Massa . |
| 3,653,294 | 4/1972 | Nason ..................... 411/34 |
| 3,657,956 | 4/1972 | Bradley et al. ........ 411/43 |
| 4,012,984 | 3/1977 | Matuschek . |
| 4,089,247 | 5/1978 | Dahl et al. . |
| 4,370,081 | 1/1983 | Briles ..................... 411/43 |
| 4,376,604 | 3/1983 | Pratt et al. .......... 411/54 X |
| 4,499,647 | 2/1985 | Sakamura et al. .... 411/34 X |

FOREIGN PATENT DOCUMENTS

| | | |
|---|---|---|
| 724508 | 1/1932 | France . |
| 1300936 | 7/1962 | France . |
| 2438761 | 5/1980 | France . |
| 46-21128 | 3/1971 | Japan .................... 411/55 |
| 429389 | 7/1967 | Switzerland . |
| 259565 | 4/1970 | U.S.S.R. ................. 411/43 |
| 553124 | 1/1932 | United Kingdom . |
| 598730 | 2/1948 | United Kingdom ........ 411/36 |
| 761149 | 11/1956 | United Kingdom . |
| 1092331 | 11/1967 | United Kingdom . |
| 160403 | 12/1981 | United Kingdom . |
| 1604503 | 12/1981 | United Kingdom . |

OTHER PUBLICATIONS

Voi-Shan/Monogram/Aerospace Fasteners Drawing #PCT-1040, 2 pages, Apr. 1974.

Primary Examiner—Lloyd A. Gall
Attorney, Agent, or Firm—Pretty, Schroeder, Brueggemann & Clark

[57] ABSTRACT

A blind fastener for securing workpieces is provided having as principle components a stem member, a drive-nut, and a deformable annular means. The stem member has an externally-threaded-portion on the accessible-side thereof, and may have a stem-head on the nonaccessible side thereof. The drive-nut to be screwed onto the externally-threaded-portion of the stem member. The deformable annular means has as principle parts a head which is larger in diameter than the diameter of the boreholes of the workpieces, and an intermediate-part adjacent the head and having an outside diameter slightly smaller than the diameter of the boreholes, and a deformable tail-part adjacent the intermediate-part and abutting and stem-head for securing the workpieces when the fastener is set. The outer-portion of the stem member contains a turning means for rotating the stem member relative to the drive-nut. The stem member contains a break groove which is operative when the fastener is set and upon further rotation of the stem member relative to the drive-nut will cause the stem member to break at the break groove. The break groove is located at a point on the stem member which, when the fastener is set, is substantially flush with the top outer surface of the head. The fasteners of this invention are particularly useful for the aircraft industry and in particular in applications where the head is a countersunk type.

4 Claims, 3 Drawing Sheets

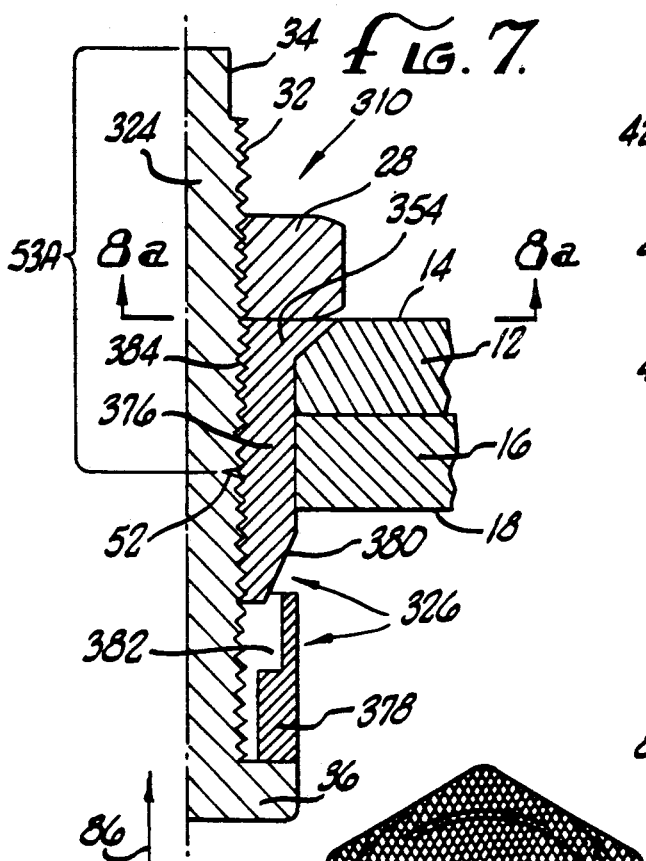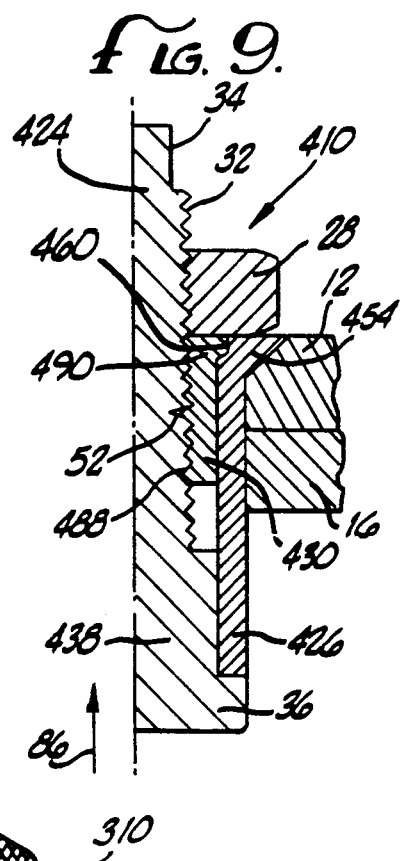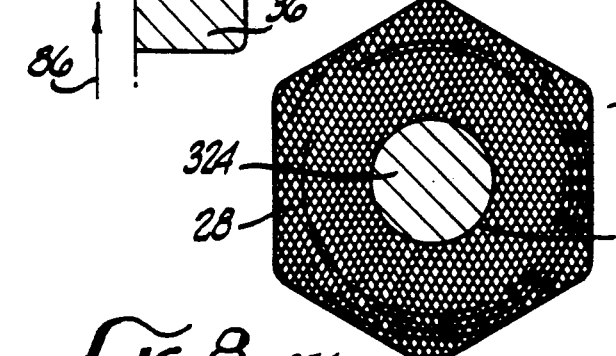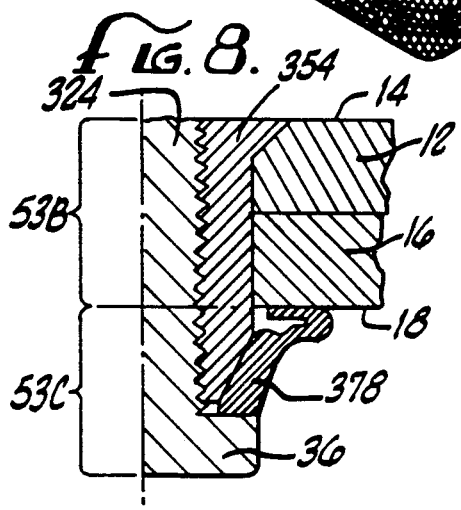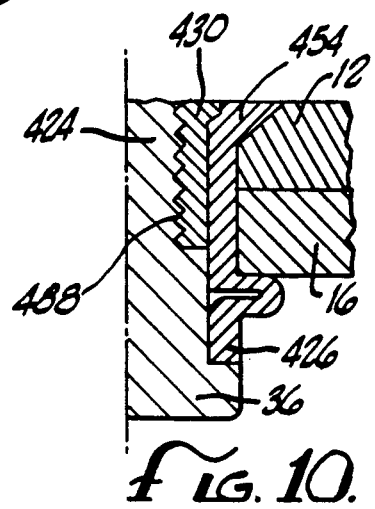

5,066,179

BLIND FASTENER

This is a continuation of application Ser. No. 583,029, filed 2-23-84, abandoned.

BACKGROUND OF THE INVENTION

1. Field of the Invention

This invention relates to fasteners, especially blind fasteners, such as rivets which are frequently used in the aerospace industry and in particular in fastening or joining both non-aerodynamic and aerodynamic surfaces to structural members of an aircraft.

2. Description of the Prior Art

Blind fasteners are used in a variety of applications wherein access to the blind-side of surfaces being connected together is extremely limited or in some cases not possible. Various particular applications impose unique, stringent requirements for which the fastener must be particularly adapted.

The application in which rivets or fasteners are used in the construction of aerodynamic designs, aircraft and the like, impose some of the most stringent requirements. In particular, the fasteners must secure the members but resist losing their gripping power under the stresses and vibrations imposed upon them by the harsh environment in which they are used. It is desirable that such fasteners produce a bulbed-like configuration on the blind-side, or non-accessible side, of the workpieces being joined.

U.S. Pat. No. 3,253,495 discloses an assembly consisting of a pin or stem having a head on the blind-side thereof and pull-grooves on the accessible-side thereof, which fits into a sleeve the blind-side portion of which is deformable into a bulbed-like shaped head. To use, the blind bolt assembly is inserted into aligned boreholes of workpieces and a special tool having a plurality of chuck jaws grips the pull-grooves and pulls the pin outwardly away from the nonaccessible workpiece, thereby deforming the sleeve on the blind-side and forming a bulbed-like configuration. Unfortunately this fastener has several disadvantages. First the fastener requires a relatively expensive tool to effect its setting. Furthermore such a tool generally requires a relatively large amount of free-space on the accessible-side in order to grip the pin securely and complete the pulling operation required to set the fastener and form a tightly secured joint. In many situations in the aircraft industry, there is not available sufficient space on the accessible side to accomodate such special tools if such are required for the specific installation. Joints which are not tight must have the fastener drilled out and another joining operation attempted. Such corrective measures greatly increase the cost of fabrication.

Thus it is desirable to have a blind fastener which can be set without the need for specially designed tools, and in fact, which can be set with readily available, relatively inexpensive, hand or power tools.

Other disadvantages of the blind bolt of U.S. Pat. No. 3,253,495 are that it has a relatively low preload retention, the importance of which will be subsequently explained, and it has a tendency to lose its locking collar thereby reducing the gripping power of the bolt and increasing the deterioration of the joint through loss of the stem with subsequent loss of radial rigidity and continual exposure to vibration over longer periods of time.

Another blind rivet, disclosed in U.S. Pat. No. 4,012,984, attempts to overcome the problem of losing the locking collar by providing a locking groove in the stem or pin of the rivet. This groove which is of a smaller diameter than the main body of the stem, is designed to hold the locking collar in the assembled rivet after it is set. The features of the locking collar and its corresponding groove described in U.S. Pat. No. 4,012,984 are useful in this invention and accordingly the relevant teachings of U.S. Pat. No. 4,012,984 is hereby incorporated herein by reference. As in U.S. Pat. No. 3,253,495, U.S. Pat. No. 4,012,984 also has the serious disadvantage of requiring a special tool for gripping the stem portion of the rivet in order to set the rivet.

Both U.S. Pat. Nos. 3,253,495 and 4,012,984 employ break grooves which enable the surplus portion of the stem, after the rivet is set, to be broken away from the rivet upon further pulling by the special gripping tool. Unfortunately a relatively rough surface is left on the accessible side of the rivet (as implied by FIG. 5 of U.S. Pat. No. 4,012,984) which is aerodynamically undesirable in streamlined surfaces employed in the aircraft and aerospace industries. Furthermore rivets which are broken totally by tension on the stem with pull tools such as those employed in both U.S. Pat. Nos. 3,253,495 and 4,012,984 produce an undesirable shock load on the fastener when the stem breaks, due to pin recoil which results in a relatively low preload retention. This problem could, of course, be eliminated in the blind rivet of these types by cutting off the stem rather than rupturing in a stem-pull operation as currently employed. However it can be appreciated that the added task of cutting off the stem of the rivet is both expensive and time consuming, and in some cases, not possible because of insufficient working space on the accessible side of the rivet.

The blind fastener described in assignee's drawing PLT-1040 consists of a flush nut which is internally threaded over its entire longitudinal length, a deformable sleeve, a core bolt and a drive-nut. After the fastener is set, the drive-nut is unscrewed from the core bolt and the stem is cut off and milled flush. Although this fastener has the advantage of eliminating stem or pin recoil it suffers from the disadvantage of requiring an expensive final milling operation to produce a smooth aerodynamically-acceptable surface. Fasteners such as PLT-1040, are constructed from a high temperature A-286 alloy, and are used on honeycomb structures which can not withstand large amounts of compressive force or "clamp-up." After the fastener is set, the drive-nut is spun off (removed) from the stem member, the excess stem member clipped off, and the remaining stem member milled flush with the outer top surface of the flush-nut.

In order to prevent the removable portion of the stem member or "pin-tails" from inadvertently ending up in a piece of machinery, or laying about the aircraft structure so that it could possibly be sucked into the aircraft engine, thereby seriously damaging such machinery or engine, the aircraft industry laborously accounts for every pin-tail. Since the A-286 alloy and similar high strength, high temperature, alloys are nonmagnetic, a magnetic sweep of the aircraft structure and assembly area to recover the pin-tails is not possible because the drive-nut (which is magnetic) has been removed before the pin-tail is clipped. Thus it is desirable to have a fastener, which when the pin-tail is severed, has the drive-nut still attached to the pin-tail thereby allowing the pin-tail to be recovered by magnetic sweeping. There is another important advantage in having the drive-nut remain with its pin-tail, namely, since the pin-tail is relatively small (and the drive-nut relatively large) the pin-tail can become lodged in small openings from which it is very difficult to discover and effect its recovery.

In pull-type fasteners such as U.S. Pat. Nos. 3,253,495 and 4,012,984 the force exerted on the workpieces by the fastener just before the stem ruptures, referred to as "clamp-up," is significantly higher than the force exerted on the workpieces after the stem is ruptured at the break groove, referred to as "preload retention." This difference or loss of clamping force is attributed to stem recoil occuring at the time of stem rupture. The greater the stem recoil therefore the lower will be the force exerted on the workpieces by the fastener. Accordingly it is desirable to sever the stem at the break groove in such a manner that stem recoil is eliminated or greatly reduced thereby resulting in higher preload retention.

Further disadvantages of other prior art fasteners are set forth in my U.S. Pat. No. 4,451,189, filed Mar. 12, 1981 which is hereby incorporated herein by reference.

Accordingly, there is a need for a blind fastener which can be set with commonly-available, relatively inexpensive, hand tools in which the surplus stem-portion can be severed without stem recoil and without expensive post-setting machining such as milling while at the same time producing an aerodynamically smooth surface at the severed stem and a joint having a relatively high preload retention. There is also a need for a blind fastener which is relatively strong in fatigue and lap shear and having no or very minimal amount of foreign object damage (F.O.D.). The various embodiments of my invention offer these long sought advantages to the aerospace and aircraft industry.

SUMMARY OF THE INVENTION

In accordance with the practice of the present invention, there is provided a novel improved blind fastener for securing workpieces having aligned boreholes therethrough. The fastener has a stem member and a corresponding drive-nut. The stem member has an externally-threaded-portion on the accessible side thereof and may have a stem-head on the nonaccessible-side thereof. The diameter of the stem-head may be slightly smaller than the diameters of the aligned boreholes. The drive-nut has an internally-threaded-portion permitting the drive-nut to be screwed onto the externally-threaded-portion of the stem member.

The fastener further comprises a deformable annular means for securing workpieces together having a head which is larger in diameter than the diameter of the aligned boreholes, an intermediate part adjacent to the head which has an outside diameter generally slightly smaller (but may also be slightly larger) than the diameter of the boreholes, such that the combined longitudinal lengths of the head and the intermediate-part is, when the fastener is set, at least equal to the combined thicknesses of the workpieces, and a deformable tail-part adjacent the intermediate-part and abutting the stem-head and having an outside diameter smaller than the diameter of the boreholes for securing the workpieces when the fastener is set. The head is essentially free of a cavity recess or cavities which are operative for gripping with a tool which will prevent rotation of the annular means. A reduced recess may be provided in the head for inspection of seating torque.

The improved fastener also comprises turning means in the outer-portion of the stem member for rotating the stem member relative to the drive-nut. The turning means and the drive-nut being operable for effecting the setting of the fastener by rotating the turning means relative to the drive-nut without the necessity for absolutely preventing any rotation of the annular means relative to the drive nut.

The fastener also contains a break groove in the stem member which has sufficient radial depth so that when the fastener is set, further turning of the stem member relative to the drive-nut will cause the stem member to break at the break groove. The break groove is located at a point on the stem member which is, when the fastener is set, substantially flush with the top outer surface of the head of the annular means.

Many of the prior art blind fasteners have a Phillips type recess in the annular head for gripping with a special tool as the outside-portion of the stem member or pin is rotated with the special tool. Frequently in the aerospace and aircraft industries, the annular heads of blind fasteners are generally very shallow in longitudinal depth. Because of this, Phillips-type or other type recesses tend to weaken the annular head. Furthermore, during the installation procedure the driving tool tends to "cam-out" the annular head thereby seriously weakening the strength of the fastener and preventing the completion of installation. In my invention however, the fastener can be set without the necessity for restraining the annular means from rotating by using a special tool and hence there is no need to have a Phillips-type recess or any type recess whatsoever in the annular head. In my invention the drive-nut translates rotary motion of the drive-nut into linear motion of the stem-head, thereby providing a number of advantages over many of the prior art blind fasteners. For example, installation may be accomplished with much lighter weight and low cost tooling. The shock loads common with pull-type fasteners experienced when the stem breaks are all eliminated in my fasteners. Because of the rotation of the stem member relative to the drive nut, the removable portion of the pin is broken off relatively smoothly and cleanly thereby eliminating stem recoil as experienced with pull-type fasteners and producing a joint having a higher preload retention.

Accordingly, a further embodiment of my fastener provides a turning means for rotating the stem member relative to the drive-nut using standard hand tools and without the necessity to use any bulky and specially designed tools for effecting the setting of the blind fastener.

In a further embodiment the head of my fastener has a substantially flat top and a conical surface so that the head can be flush-mounted with the accessible surface of an outer workpiece having a counter sunk borehole.

In another embodiment the annular means cannot be removed from the workpiece except by unscrewing or breaking the annular means. In still another further embodiment of my fastener, after the fastener is set, the annular means cannot be removed from the workpieces without breaking the annular means.

In still another embodiment the annular means is a single piece construction wherein the tail-part is gradient hardened and forms a bulbed configuration when the fastener is set.

In another embodiment the tail-part of the annular means is two-piece constructed having a first piece which is an annular nondeformable-piece and a second piece which is an annular deformable-piece. The nondeformable-piece is an extension of the intermediate-part of the annular means and is one-piece constructed therewith and has a conical chamfer on the end opposite the annular head which is operable as a wedge for deforming the deformable-piece. In a further embodiment, except for the chamfer, the inside and outside diameters of the nondeformable-piece are substantially equal to the inside and outside diameters of the intermediate-part of the annular means. The deformable-piece is separated from the nondeformable-piece and spaced longitudinally between the nondeformable-piece and the stem-head and abuts the stem-head and is adaptable, when the fastener is set, to deform the end of the deformable-piece adjacent the nondeformable-piece outwardly along the outside surface of the nonaccessible workpiece.

In another further embodiment the annular head has an annular cavity adjacent the outer surface and inside diameter thereof, the intermediate-part of the annular means has a shoulder-section adjacent the cavity, and a thinner-section adjacent the shoulder-section such that the inside diameter of the thinner-section is larger than the inside diameter of the shoulder-section. In this embodiment the stem-member has a removable-portion which comprises a turning means and the externally-threaded-portion, a plug-portion adjacent the removable-portion, and a tail-portion adjacent the plug-portion and comprising the stem-head. The plug-portion has an outer-section adjacent the break groove. The outer-section also has an annular locking groove. The plug-portion also has an intermediate-section adjacent the outer-section and having an outside diameter slightly smaller than the inside diameter of the shoulder-section. Still further the plug-portion has an inner-section adjacent the intermediate-section, and having an outside diameter slightly smaller than the inside diameter of the thinner-section, such that, when the fastener is set, the intermediate-sec=tion abuts the shoulder-section and the inner-section abuts the thinner-section. This embodiment of the fastener further comprises an annular locking ring having a thick-segment which fits into the locking groove and abuts the shoulder-section, and a thin-segment adjacent the thick-segment which abuts the outer-section and the shoulder-section, such that, when the fastener is set, the locking ring is compressed into the locking groove and the space between the shoulder-section, the cavity, the outer-section and the drive-nut. In a still further embodiment the locking groove is immediately adjacent the intermediate-section.

In a further embodiment the inner-section extends into the tail-portion and is adjacent to the stem-head and the thinner-section extends over the entire longitudinal length of the tail-part and the inside diameter of the tail-part abuts the outside diameter of the inner-section and further wherein the tail-part is gradient-hardened so that when said fastener is set a bulbed configuration is formed against the unaccessible surface of the inner and nonaccessible workpiece.

In an alternative embodiment, the stem-head has an annular tapered section which is operable when said fastener is set, to flare the tail-part of the annular means radially against the outside surface of the nonaccessible workpiece.

In another embodiment of this invention the annular head has an annular cavity adjacent to the outer surface and inside diameter thereof, the inside and outside diameters of the intermediate-part of the annular means are equal to the inside and outside diameters respectively of the tail-part, wherein the stem member has a removable-portion, a plug-portion adjacent to the removable-portion, and a tail-portion adjacent to the plug-portion, wherein the removable-portion comprises the turning means and a part of the externally-threaded-section of the stem member, wherein the plug-portion comprises the remaining part of the externally-threaded-section of the stem member, and a part of an inner-section having an outside diameter slightly smaller than the inside diameter of the tail-part, the externally-threaded-portion being adjacent to one end of the inner section, the remaining part of the inner-section being adjacent to the stem-head. In this embodiment the fastener also comprises a threaded locking means having an inside diameter about equal to the outside diameter of the externally-threaded-section of the stem member, the outside diameter which abuts the inside diameter of the annular means, and a flange which fits into a recess of the annular head, such that, when the fastener is set, the locking means is compressed into the space between the externally-threaded-portion of the stem member, the inside diameter of the annular means, the cavity of the annular head and the drive-nut.

In another embodiment of this invention, the annular head has an annular recess adjacent the outside surface and inside diameter thereof comprising a chamfer at an acute angle to the axis of the fastener which begins at the inside diameter of the annular means, and an annular notch adjacent the chamfer and the top-outer surface of the annular head. The chamfer and annular notch forming a longitudinal-recess-surface in the annular means. The fastener in this embodiment also comprises an annular locking ring having an outer longitudinal-surface which is substantially identical to the longitudinal-recess-surface of the annular means and in abutting relationship to the longitudinal-recess-surface, having an inside diameter about equal to the outside diameter of the externally-threaded-portion of the stem member, and formed from a material that, when the fastener is set, is deformable into the threads of the externally-threaded-portion of the stem member. In this embodiment when the fastener is set, the locking ring is compressed into the space between the externally-threaded-portion of the stem member, the longitudinal-recess-surface, and the drive-nut.

In another embodiment of this invention the stem-member has an intermediate-portion having an outside diameter slightly smaller than the inside diameter of the intermediate-part of the annular means and the intermediate-portion has an annular locking groove positioned, when the fastener is set, near the accessible-surface of the outer-workpiece. This embodiment further comprises an annular locking ring having a thick-segment which fits into the locking groove and which abuts the inside diameter of the annular means, a thin-segment adjacent the thick segment which abuts the inside-diameter of the annular means, and which is formed from a material such that, when the fastener is set, the locking ring is compressed to the locking groove and the space between the inside diameter of the annular means, a recess in the annular head, and the drive-nut.

In another embodiment of this invention the stem member of the fastener has a removable-portion comprising the turning means and the externally-threaded-portion, a plug-portion adjacent the removable-portion, and a tail-portion adjacent the plug-portion which comprises the stem-head. The plug-portion contains an annular locking groove adjacent the externally-threaded-portion and, a second externally-threaded-section having an outside diameter larger than the outside diameter of the first-mentioned externally-threaded-portion and adjacent the locking groove. The annular head has an annular recess adjacent the outer surface and inside the diameter thereof. The intermediate-part of the annular means has an internally-threaded section adjacent the recess and extending into the tail-part. The internally-threaded-section is adapted to permit the annular means to be screwed on to the second externally-threaded-section of the stem-member. This embodiment of the fastener further comprises an annular locking ring having a thick segment which fits into the locking groove and abuts the internally-threaded-section of the annular means, and a thin-segment adjacent the thick-segment which also abuts the internally-threaded-section, and formed from a material such that, when the fastener is set, the locking ring is compressed into the locking groove and the space between the stem member, the recess of the annular head, and the drive-nut.

In another embodiment which is particularly useful the externally-threaded-portion of the stem member extends longitudinally to the stem-head. The annular head, the intermediate-part, and at least a part of the tail-part of the annular means is internally-threaded and adapted to permit the annular means to be screwed onto the externally-threaded-portion of the stem member.

In another embodiment of this invention the externally-threaded-portion of the stem member of the fastener extends, when the fastener is set, below the accessible surface of the outer workpiece, and the intermediate-part of the annular means has an internally-threaded-section adaptable to permit the annular means to be screwed onto the externally-threaded-portion of the stem member such that, when the fastener is set, the threads of the internally-threaded-section remain screwed onto a part of the externally-threaded-portion.

In another embodiment useful for all of the above-described embodiments, the break groove has a configuration which permits the stem member to be broken with a relatively-smooth break off surface and without pin recoil thereby enabling the set fastener to have a relatively high preload retention compared to blind fasteners employing a pull-type stem.

Furthermore in all embodiments of this invention it is not necessary that the drive-nut be removed from the stem member before the stem member is severed. Thus the drive-nut advantageously remains with the severed portion of the stem member so that it can be recovered by a magnetic sweep of the area. Thus in some embodiments the stem member is made from a nonmagnetic metal.

Many prior art fasteners which comprise a cavity or cavities in the head for engaging with the nose of a gripping tool, can not be made of aluminum or other soft metals because the annular head will cam-out. The fastener of this invention however can have the annular means made from an aluminum alloy or other soft metal since these fasteners do not contain such cavities. Thus the fasteners of this invention can have relatively thin heads as compared to fasteners which require cavities in the head to prevent rotation.

The fasteners of this invention are relatively inexpensive, can be adopted to have a flush stem-break, can be installed with lighter, less-expensive, standard hand-tools, have a higher clamp-up and preload retention, and can be installed where the free space on the accessible-side is relatively small. Furthermore some embodiments are stronger in fatigue and are believed to be stronger in lap shear than present fasteners. These advantages provide a distinct improvement over prior art blind fasteners.

BRIEF DESCRIPTION OF THE DRAWING

FIG. 7 is a cross-sectional view of a fourth embodiment of a blind fastener of this invention.

FIG. 8 is a cross-sectional view of the fastener of FIG. 7 when the fastener is set.

FIG. 8a illustrates knurling which may be used on the undersurface of the drive nut shown in FIG. 7.

FIG. 9 is a cross-sectional view of a fifth embodiment of a blind fastener of this invention.

FIG. 10 is a cross-sectional view of the fastener of FIG. 9 when the fastener is set.

DESCRIPTION OF THE PREFERRED EMBODIMENTS

Figure 1:
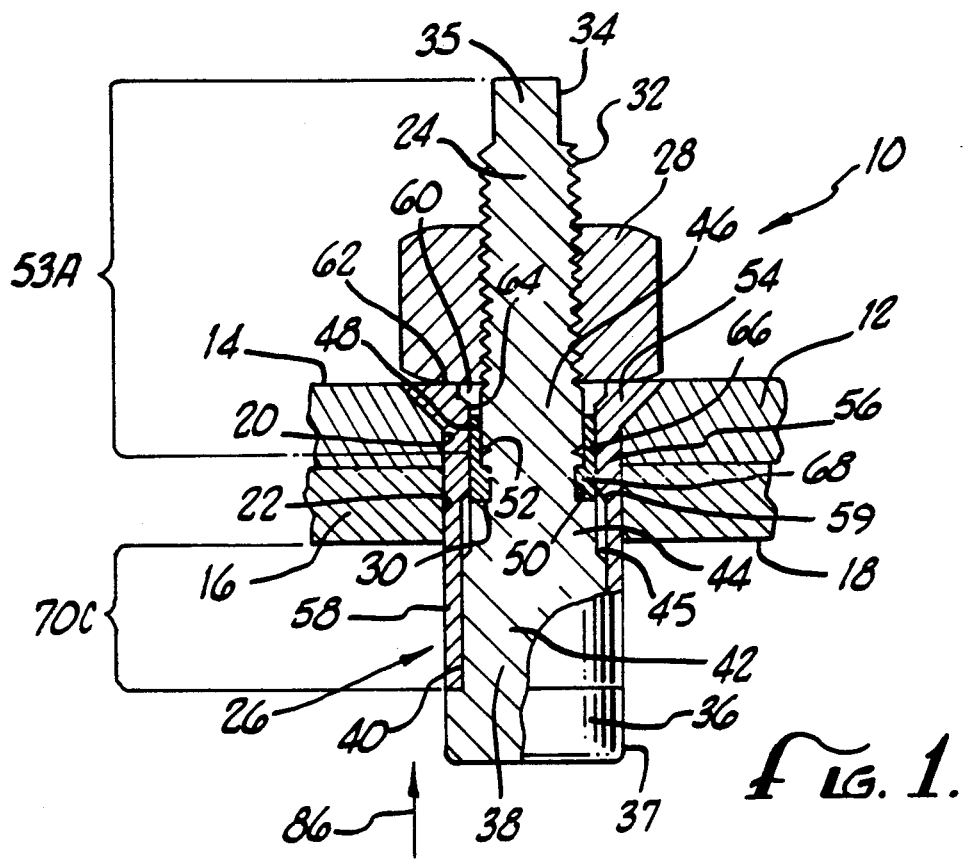
FIG. 1 is a partial cross-sectional view of one embodiment of a blind fastener of this invention.

FIG. 1 is a partial cross-sectional view of a particular embodiment of a blind fastener of this invention. Referring to FIG. 1, fastener 10 is used to join outer and accessible workpiece 12 having accessible surface 14 and inner or nonaccessible workpiece 16 having nonaccessible surface 18. Fastener 10 is inserted through aligned boreholes 20 and 22 of the accessible and nonaccesible workpieces. The principal components of fastener 10 consists of stem member 24, annular means 26, drive nut 28, and annular locking ring 30.

Stem member 24 has an externally-threaded-section 32, turning means 34 having wrenching flats 34. Outside diameter 37 of stem-head 36 is just slightly smaller than the diameter of the boreholes 20 and 22. Stem member 24 also contains cylindrical inner-section 38 having outside diameter 40 which is smaller than the outside diameter 37 of stem-head 36. Adjacent to inner-section 38, is cylindrical intermediate-section 42 having outside diameter 44 which is smaller than outside diameter 40 of inner-section 38. Chamfer 45 provides a transition between section 38 and 42. Adjacent to intermediate-section 42, is a cylindrical outer-section 46 having an outside diameter 48 which is smaller than outside diameter 44. Outer-section 46 contains annular locking ring groove 50 and break groove 52. The minimum diameter of break groove 52 is smaller than the inside diameter of threaded section 32 and the inside diameter of locking groove 50.

In general, in all embodiments, the stem member contains the following principal parts: removable-portion 53A which extends from the break groove longitudinally outwards to the turning means; plug-portion 53B extending longitudinally, when the fastener is set, between the break groove and unaccessible surface 18; and tail-portion 53C which includes the stem-head and extends therefrom to, when fastener is set, unaccessible surface 18. Portions 53A, B and C of the stem member exist in all embodiments but are pointed out only in several of the FIGURES.

Annular means 26 comprises a head 54, which is shown as annular but is not necessarily always so, annular shoulder-section 56 and annular thinner-section 58. The inside diameter of annular thinner-section 58 is just slightly larger than outside diameter 40, and the outside diameter of thinner-section 58 is just slightly smaller than the diameter of boreholes 20 and 22. The outside diameter of shoulder-section 56 is the same as the outside diameter of thinner-section 58. The inside diameter of shoulder-section 56 is just slightly larger than the outside diameter of intermediate-section 42. Chamfer 59 provides a transition between section 56 and 58, and is designed to match chamfer 45. Annular means 26 also contains an annular recess 60 which is adjacent to the outer surface 62 and the inside diameter of shoulder-section 56.

Annular locking ring 30 is formed from a single piece of deformable material having an annular thin-segment 66 which is adjacent to an annular thick-segment 68. Locking ring 30 is disposed in locking groove 50 thereby requiring the locking ring to move with stem member 24. Locking ring 30, before the fastener is set, abuts on its outside diameter shoulder-section 56 of annular means 26 and on its inside diameter outer-section 46 of stem member 24.

In general in all embodiments the annular means contains the following principal parts: annular head 70A; intermediate-part 70B extending longitudinally from the annular head to, when the fastener is set, the nonaccessible head to, when the fastener is set, the nonaccessible surface 18; and tail-part 70C extending inwardly from the nonaccessible surface 18, when the fastener is set, to the nonaccessible extremity of the annular means. Parts 70A, B and C of the annular means exist in all embodiments but are pointed out only in several of the FIGS.

Figure 2:
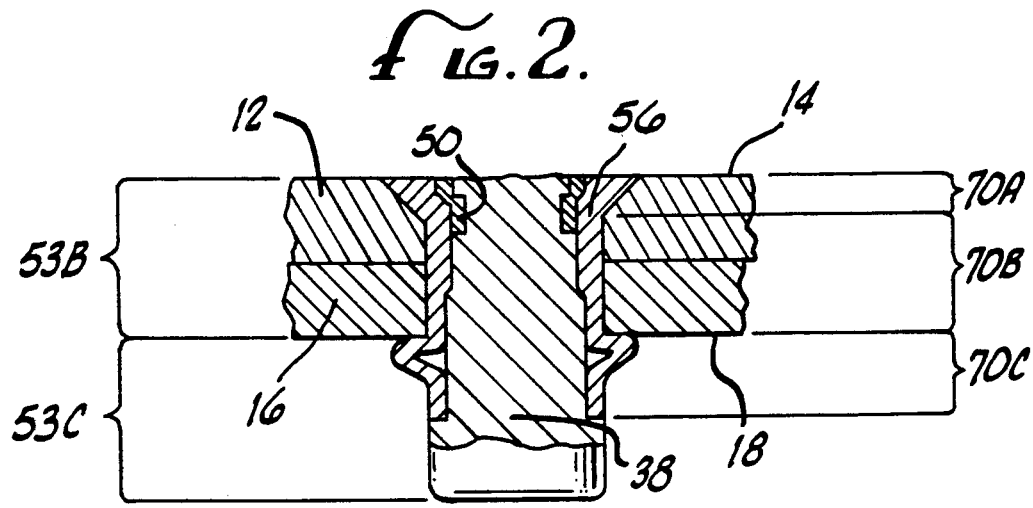
FIG. 2 is a cross-sectional view of the fastener of FIG. 1 when the fastener is set.

When fastener 10 is set tail-part 70C of annular means 26 is deformed against lower and nonaccessible surface 18 of inner workpiece 16, as shown in FIG. 2, chamfer 45 of inner-section 38 is abutted up against chamfer 59 of shoulder-section 56, and locking ring 30 is compressed in locking groove 50 and deformed and compressed into recess 60 under drive-nut 28. Further rotation of stem member 24 relative to drive-nut 28 causes the stem to twist off and break relatively smoothly at break groove 52 without stem recoil thereby producing a joint having relatively high preload retention.

Tail-part 70C of annular means 26 preferably is gradient hardened so that tail-part 70C will be deformed into a bulbed configuration which is pressed over a substantial part of nonaccessible surface 18 of inner workpiece 16 as shown in FIG. 2 and FIG. 10 of another embodiment of this invention. Gradient hardening is well known in the art and forms no part of this invention.

Figure 3:
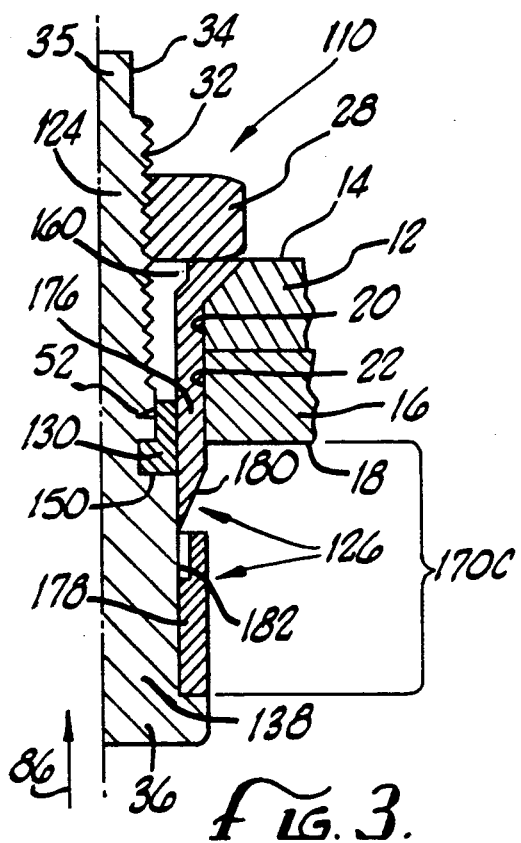
FIG. 3 is a cross-sectional view of a second embodiment of a blind fastener of this invention.

Turning now to FIG. 3, a second embodiment of this invention, depicted by fastener 110, is shown wherein the plug-portion of stem member 124 contains annular locking groove 150 which is adjacent to a inner-section 138 which has an outside diameter which is larger than the outside diameter of externally-threaded-portion 32. Annular means 126 comprises annular nondeformable-piece 176 and annular deformable-piece 178. Nondeformable-piece 176 contains chamber 180 which abuts recess 182 in deformable-piece 178.

Annular locking ring 130 is similar in configuration and material to ring 30 of FIG. 1.

When fastener 110 is set, locking ring 130 is compressed into locking groove 150 and the space between stem member 124, recess 160 and drive-nut 28.

Figure 4:
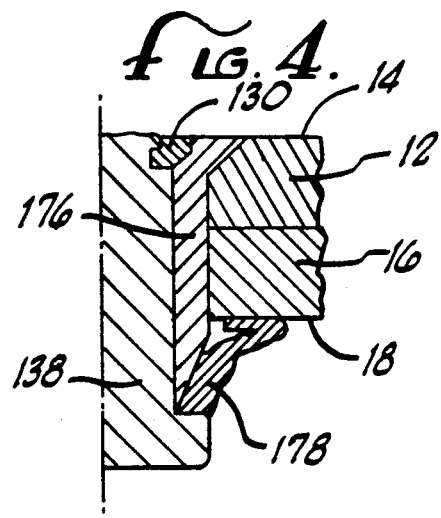
FIG. 4 is a cross-sectional view of the fastener of FIG. 3 when the fastener is set.

When fastener 110 is set, deformable piece 178 is deformed upwards and outwards against nonaccessible surface 18 of inner workpiece 18, as shown in FIG. 4. Deformation of piece 178 is achieved by gripping flat surfaces 34 of stem member 124 and drive-nut 28 with standard wrench, and by turning stem member 124 relative to drive-nut 28, causing stem member 124 to be pulled longitudinally outwardly through workpieces, in the direction of arrow 86, causing deformable piece 178 to engage chamfer 180 and be deformed upwards and outwards. As stem member 124 is further advanced the top portion of piece 178 engages lower surface 18 whereupon further advancement of stem 124 in the direction of arrow 86 causes piece 178 to be turned radially inwardly along surface 18. Further advancement of stem member 124 will cause fastener 110 to set so that piece 178 has been deformed upwardly and outwardly abutting a relatively wide annular area of surface 18, while locking ring 130 has been tightly compressed to locking groove 150 and recess 160. Further rotation of the stem member relative to the drive-nut causes the outer portion of stem member 124 to break smoothly and cleanly at break groove 52, without stem member recoil, thereby separating the outer-portion and drive-nut 28 from the plug-portion of stem member 124 and securing the workpieces as shown in FIG. 4.

Figure 5:
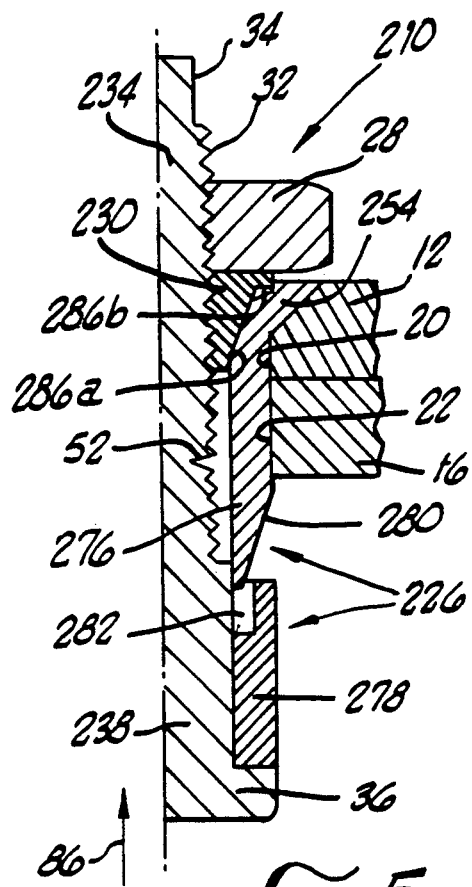
FIG. 5 is a cross-sectional view of a third embodiment of a blind fastener of this invention.

Turning now to FIG. 5, a third embodiment of this invention, depicted by fastener 210, is shown wherein annular head 254 has an annular recess adjacent the outer surface and inside diameter thereof. The recess has annular chamfer 286a at an acute angle to the axis of the fastener which begins at the inside diameter of annular means 226. Annular notch 286b is adjacent to chamfer 286a and the top-outer surface of annular head 254. Chamfer 286a and notch 286b form a longitudinal-recessed-surface in annular means 226.

Fastener 210 contains annular locking ring 230 having an outer longitudinal surface which is substantially identical to the longitudinal-recessed-surface of annular means 226 and in abutting relationship thereto. Locking ring 230 has an internally threaded inside diameter adaptable for screwing onto externally-threaded-portion 32 of stem member 224.

Annular means 226 comprises annular nondeformable-piece 276 and annular deformable-piece 278. Nondeformable-piece 276 contains chamfer 280 which abuts recess 282 in deformable piece 278.

The tail-portion of stem member 224 contains stem-head 36 and inner-section 238 which extends into the plug-portion of the stem member. Inner-section 238 is adjacent to externally-threaded portion 32.

Figure 6:
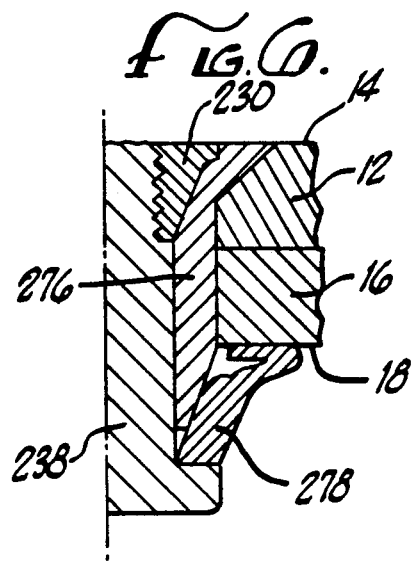
FIG. 6 is a cross-sectional view of the fastener of FIG. 5 when the fastener is set.

The inside diameter of piece 276 and 278 are equal, and are slightly larger than the outside diameter of inner-section 238. As with fastener 110, when fastener 210 is set, deformable piece 278 is deformed upwards and outwards against nonaccessible surface 18 as shown in FIG. 6. Setting of fastener 210 is achieved by gripping wrenching flats 34 of stem-member 224 and drive-nut 228 with standard wrenches and turning stem member 224 relative to drive-nut 228, thereby causing stem member 224 to be pulled longitudinally outwardly through the workpieces in the direction of arrow 86 causing piece 278 to engage chamfer 280 and be deformed upwards and outwards in the manner described with regard to fastener 110 in FIG. 4. When fastener 210 is set, locking ring 230 is compressed into the space between threads 32, the longitudinal-recess-surfaces formed by chamfer 286a and notch 286b, and drive-nut 28. After the fastener is set, further tightening causes the outer portion of stem member 224 to break smoothly and cleanly at break groove 52, without stem member recoil, thereby separating the outer portion of stem member 224 and drive-nut 28, and securing the workpieces as shown in FIG. 6.

A fourth embodiment of this invention is shown in FIG. 7 in which stem member 324 has externally-threaded-section 32 extending from the outer extremity of stem member 324 to stem head 36. Annular means 326 comprises annular nondeformable-piece 376 and annular deformable-piece 378. Piece 376 contains chamfer 380 which abuts recess 382 in piece 378. Piece 376 has internally-threaded-section 384 extending from outer surface of annular head 354 longitudinally along the plug-portion of piece 376. Internally-threaded-section 384 is adapted to be screwed onto externally-threaded-section 32 of stem member 324. Setting of fastener 310 is achieved by gripping wrenching flats 34 and drive-nut 28 thereby causing deformable-piece 378 to be deformed in the manner shown in FIG. 8. After fastener 310 is set, further turning of stem member 324 relative to drive-nut 28 causes stem member 324 to break smoothly and cleanly at break groove 52, without stem member recoil, thereby separating drive-nut 28 and outer-portion from the plug-portion of stem member 24 and thereby securing the workpieces as shown in FIG. 8.

A fifth embodiment of this invention is depicted by fastener 410 in FIG. 9. Stem member 424 comprises wrench flats 34, externally-threaded-section 32, break groove 52, stem-head 36 and cylindrical inner-section 438. Fastener 410 also comprises annular locking ring 430 having internally-threaded-section 488 which is adapted to be screwed onto threaded-section 32. Annular means 426 having annular head 454 is cylindrical in construction having one outside diameter and one inside diameter over both the intermediate-part and tail-part thereof. The inside diameter of the tail-part of annular means 426 is just slightly larger than the outside diameter of inner-section 438 of stem member 424. Annular head 454 contains annular recess 460. Annular ring 430 contains a flange-section 490 which has a contour matching recess 460. Fastener 410 is set using standard wrenches as described in other embodiments. Stem member 424 is then turned relative to drive-nut 28 thereby advancing the stem member in the direction of arrow 86 relative to the workpieces. The tail-part of annular means 426 is deformed in the manner described for the tail-part of fastener 10 shown in FIGS. 1 and 2. Further advancement of stem member 424 causes locking ring 430 to be tightly compressed into recess 460 and the space between threaded-section 32, annular means 426 and drive-nut 28. Further rotation of stem member 424 relative to drive-nut 28 causes the outer-portion of the stem member to break smoothly and cleanly at break groove 52 without stem member recoil as in the other embodiments previously described and secures the workpieces as shown in FIG. 10.

A further embodiment of my invention, which is adaptable and useful on all previously described embodiments involves increasing the friction between the drive-nut and the outer top surface of the annular head of the annular means. This can be achieved by modifying either the surface of the drive-nut which is adjacent to the annular head, or the outer top surface of the annular head, or both surfaces. Nonlimiting examples of methods of modifying such surfaces are abrading, coating, and knurling.

It is known that if the drive-nut is allowed to be screwed down tighter and tighter against the head of the annular means as the fastener is set that a tensile force is induced in the stem member at the point at which the stem member exits the annular means and this tensile force will reduce the maximum torque that can be applied to the fastener and the gripping force of the fastener. This undesirable tensile force can be reduced by increasing the friction between the surfaces of the drive-nut and the annular head.

It is preferable in all the above-embodiments to rotate the stem member and hold the drive-nut stationery. However it is to be understood that the stem-member could be held stationary and the drive-nut rotated.

All the embodiments shown sever the stem member at the break groove smoothly and cleanly without stem member recoil, thereby producing joints having relatively high preload retention. Furthermore the embodiments described herein do not require a special tool for gripping and pulling the removable portion of the stem member. Because a twisting motion is applied to the stem relative to the workpieces to sever the removable-portion of the stem member, rather than merely a tension pull, improved joints are produced. Some users of composite-type blind fasteners do not allow the use of pull-type fasteners because stem recoil damages the fibers of the installation making the invention attractive to such users. Furthermore, since standard tools may be used to set the fasteners of this invention a minimum of free space is required on the accessible side of the outer workpiece, thereby enabling the fasteners of this invention to be used where other types of blind fasteners can not.

The break off of the stem is generally at a point substantially flush with the surrounding surfaces of the accessible side of the installation. However, the term "substantially flush" as used herein means that the stem breaks off at a point that may be sightly above or below such surfaces.

While it will be apparent that the preferred embodiment disclosed herein offers distinct advantages over prior art fasteners, it will be appreciated that such preferred embodiments can be modified without departing from the scope of this invention. For example, the tail-part of the annular means depicted in FIGS. 2 and 10 can be substituted for the tail part of FIGS. 4, 6, 8 and 12 if desired and vice versa. Furthermore other tail parts as described in the specification and not shown in the FIGURES can be substituted. Accordingly the scope of this invention is defined by the claims.

What is claimed is:

1. A wrench and fastener combination comprising:
   a blind fastener for mounting in aligned openings through two workpieces to connect them together in overlapped outer and inner relation, the fastener including:

an internally threaded, generally tubular fastener body received within the openings in the workpieces having,
an inner end projecting inwardly beyond the inner workpiece, and
an enlarged body head engaging the outer workpiece;
an externally threaded cylindrical stem passing in threaded engagement through said fastener body, turning motion of said stem relative to said fastener body in one direction moving said stem in an axially outward direction through said body, said stem having,
an enlarged stem head spaced from the inner end of said fastener body, and
a wrench engaging region spaced outwardly from said fastener body head;
a deformable sleeve around said stem in contact with said stem head, movement of said stem outwardly through said fastener body deforming said sleeve to a fully set condition in overlying contact with the inner surface of the inner workpiece;
a drive nut separate from said fastener body threadedly mounted on said stem in contact with said body head restraining said fastener body from turning in the workpieces, at least one of said drive nut and said body head being knurled to increase the friction between said drive nut and said body head;
first wrench means engaging said drive nut for holding it against rotation;
second wrench means engaging said wrench engaging region for applying turning force to turn said stem in the one direction relative to said drive nut;
a localized weakened region in said stem at an axial location positioned substantially flush with an outer surface of said body head when said sleeve is fully set; and
an outer portion of said stem extending outwardly of said weakened region through said drive nut, said outer portion with said drive nut attached being twisted off at said weakened region by continued application of turning force to said outer portion of said stem in the one direction after said sleeve is fully set.

2. A wrench and fastener combination comprising:
a blind fastener for mounting in aligned openings through two workpieces to connect them together in overlapped outer and inner relation, the fastener including:
an internally threaded, generally tubular fastener body received within the openings in the workpieces having,
an inner end projecting inwardly beyond the inner workpiece, and
an enlarged body head engaging the outer workpiece;
an externally threaded cylindrical stem passing in threaded engagement through said fastener body, turning motion of said stem relative to said fastener body in one direction moving said stem in an axially outward direction through said body, said stem having,
an enlarged stem head spaced from the inner end of said fastener body, and
a wrench engaging region spaced outwardly from said fastener body head;
a deformable sleeve around said stem in contact with said stem head, movement of said stem outwardly through said fastener body deforming said sleeve to a fully set condition in overlying contact with the inner surface of the inner workpiece;
a drive nut separate from said fastener body threadedly mounted on said stem in contact with said body head restraining said fastener body from turning in the workpieces, at least one of said drive nut and said body head having a rough abraded surface to increase the friction between said drive nut and said body head;
first wrench means engaging said drive nut for holding it against rotation;
second wrench means engaging said wrench engaging region for applying turning force to turn said stem in the one direction relative to said drive nut;
a localized weakened region in said stem at an axial location positioned substantially flush with an outer surface of said body head when said sleeve is fully set; and
an outer portion of said stem extending outwardly of said weakened region through said drive nut, said outer portion with said drive nut attached being twisted off at said weakened region by continued application of turning force to said outer portion of said stem in the one direction after said sleeve is fully set.

3. A blind fastener for mounting in aligned openings through two workpieces to connect them together in overlapped outer and inner relation and adapted to be set by wrench means for applying turning force to the fastener, the fastener comprising:
an internally threaded, generally tubular fastener body received within the openings in the workpieces having,
an inner end projecting inwardly beyond the inner workpiece, and
an enlarged body head engaging the outer workpiece;
an externally threaded cylindrical stem passing in threaded engagement through said fastener body, turning motion of said stem relative to said fastener body in one direction moving said stem in an axially outward direction through said body, said stem having,
an enlarged stem head spaced from the inner end of said fastener body, and
a wrench engaging region spaced outwardly from said fastener body head;
a deformable sleeve around said stem in contact with said stem head, movement of said stem outwardly through said fastener body deforming said sleeve to a fully set condition in overlying contact with the inner surface of the inner workpiece;
a drive nut separate from said fastener body threadedly mounted on said stem in contact with said body head restraining said fastener body from turning in the workpieces, at least one of said drive nut and said body head being knurled to increase the friction between said drive nut and said body head, said drive nut and said wrench engaging region of said stem being adapted for concurrent engagement by the wrench means for holding said drive nut against rotation and turning said stem relative to said drive nut in said one direction;
a localized weakened region in said stem at an axial location positioned substantially flush with an outer surface of said body head when said sleeve is fully set; and an outer portion of said stem extending outwardly of said weakened region through said drive nut, said outer portion with said drive nut attached being twisted off at said weakened region by continued application of turning force to said outer portion of said stem in the one direction after said sleeve is fully set.

4. A blind fastener for mounting in aligned openings through two workpieces to connect them together in overlapped outer and inner relation and adapted to be set by wrench means for applying turning force to the fastener, the fastener comprising:

an internally threaded, generally tubular fastener body received within the openings in the workpieces having, an inner end projecting inwardly beyond the inner workpiece, and an enlarged body head engaging the outer workpiece;

an externally threaded cylindrical stem passing in threaded engagement through said fastener body, turning motion of said stem relative to said fastener body in one direction moving said stem in an axially outward direction through said body, said stem having, an enlarged stem head spaced from the inner end of said fastener body, and a wrench engaging region spaced outwardly from said fastener body head;

a deformable sleeve around said stem in contact with said stem head, movement of said stem outwardly through said fastener body deforming said sleeve to a fully set condition in overlying contact with the inner surface of the inner workpiece;

a drive nut separate from said fastener body threadedly mounted on said stem in contact with said body head restraining said fastener body from turning in the workpieces, at least one of said drive nut and said body head having a rough abraded surface to increase the friction between said drive nut and said body head, said drive nut and said wrench engaging region of said stem being adapted for concurrent engagement by the wrench means for holding said drive nut against rotation and turning said stem relative to said drive nut in said one direction;

a localized weakened region in said stem at an axial location positioned substantially flush with an outer surface of said body head when said sleeve is fully set; and an outer portion of said stem extending outwardly of said weakened region through said drive nut, said outer portion with said drive nut attached being twisted off at said weakened region by continued application of turning force to said outer portion of said stem in the one direction after said sleeve is fully set.

* * * * *